April 24, 1928.  
V. J. CHAPMAN  
APPARATUS FOR FUSION WELDING  
Filed Aug. 2, 1926  
1,667,586
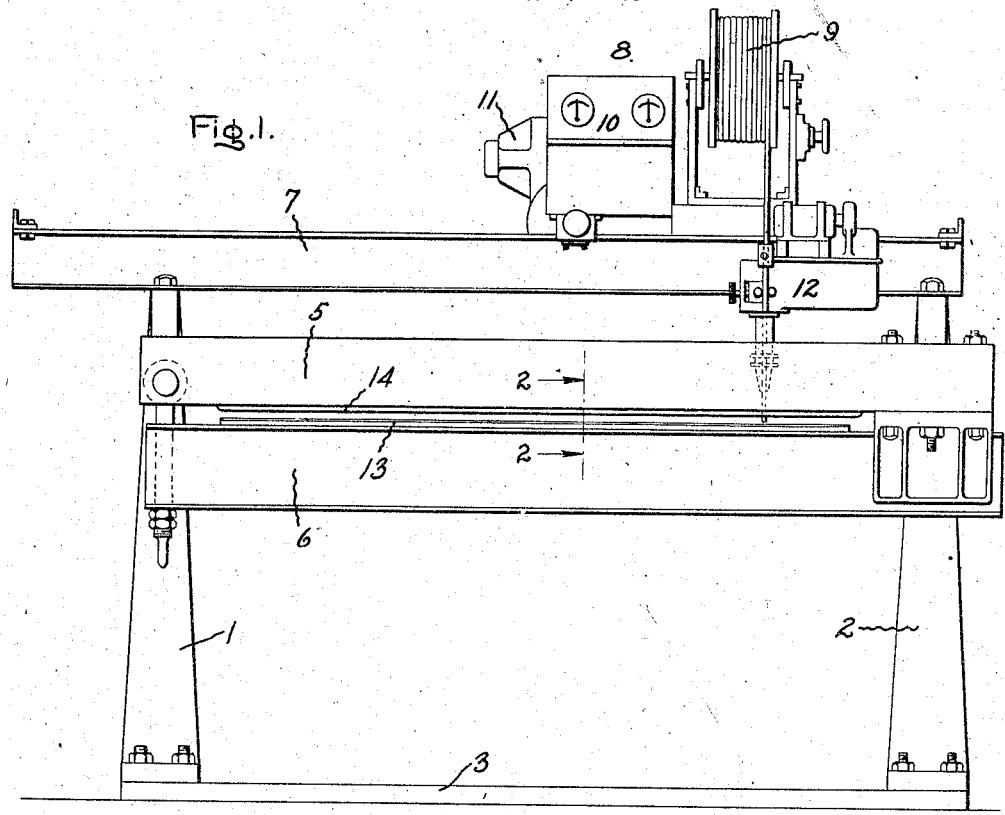
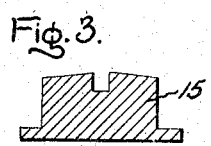
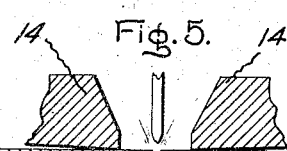
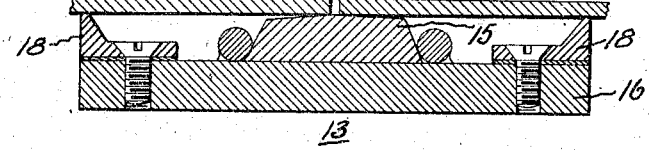
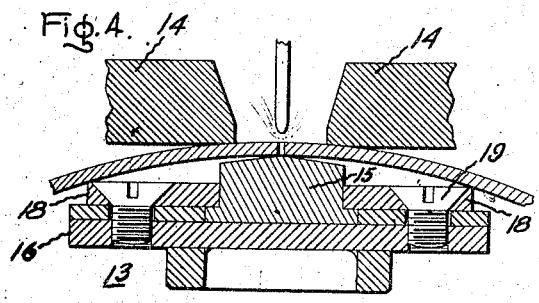
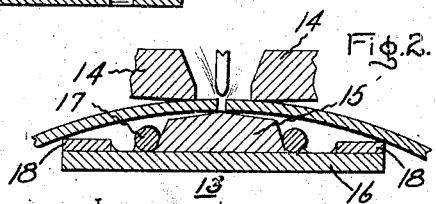
Inventor:  
Verni J. Chapman,  
by  
His Attorney.

Patented Apr. 24, 1928.

1,667,586

UNITED STATES PATENT OFFICE.

VERNI J. CHAPMAN, OF SCHENECTADY, NEW YORK, ASSIGNOR TO GENERAL ELECTRIC COMPANY, A CORPORATION OF NEW YORK.

APPARATUS FOR FUSION WELDING.

Application filed August 2, 1926. Serial No. 126,709.

My invention relates to fusion welding and more particularly to a clamping mechanism comprising a backing member of improved construction.

In the fusion welding of metal parts the edges to be united are clamped in juxtaposition upon a backing member which may serve to support the work. With this arrangement, difficulty is frequently encountered due to the fact that the edges do not lie smoothly upon the backing member. If the edges of the metal parts are not tightly clamped against the backing member, it is found that a hole will be cut through the metal wherever the metal is not in good contact with the backing member. This is particularly true with thin metal parts.

An object of my invention is to provide an improved arrangement in which the edges of the work will be tightly clamped at the seam. A further object of my invention is to provide a backing member of improved construction against which the parts of tanks and pipes may be clamped during welding in such a manner that the finished article will have the correct curvature at the welded seam.

If the welded pipe or tank is to be used as a pressure vessel, the importance of preserving the true circular shape of the vessel will be apparent from the following considerations. If that part of the vessel near the longitudinal seam is not truly circular, it will be forced by the pressure within the vessel to assume a circular shape. Any changes in pressures within the vessel will produce corresponding changes in the amount of deformation that takes place at the seam and with continued changes the continued flexure at the joint will eventually result in failure of the metal in or at the seam. For example, in the process of manufacturing pipes, pieces of sheet metal are shaped into cylindrical form by passing them through bending rolls before the edges are united by welding. These rolls, however, do not bend to circular shape the first few inches and the last few inches of the plates that are passed through them. Consequently, there are certain portions of the preformed pipes at the seam that are not truly circular in section. My clamping means insures that these unformed parts will be bent to the correct curvature and that while held in this position welded so that the finished article will have a true circular shape at the seam.

My invention will be better understood from the following description when considered in connection with the accompanying drawing, and its scope will be pointed out in the appended claims.

Referring to the drawing, Fig. 1 shows a front view of a machine in which my invention is embodied, Figs. 2, 4 and 5 show sectional views illustrating modifications of my invention, and Fig. 3 shows a variation in the construction of one of the elements of the invention.

My invention is of general application in the art of fusion welding in that it may be used in metallic arc welding, carbon arc welding where the arc is between the electrode and the work, in gas welding or electric arc welding wherein the arc is between electrodes independently of the work, and it may be used whether the welding operation be performed manually or automatically.

In Fig. 1 my invention is shown for the purpose of illustration as applied to an automatic metallic arc welding machine of a type, examples of which are now well known in the art. This machine comprises pillars 1 and 2 mounted on a base 3 arranged to support members 5 and 6, between which the work is clamped, and a track 7 for the welding carriage 8. This welding carriage is shown as provided with a reel of welding wire 9, a meter board 10, travel motor 11, and a welding head 12. The welding head is of suitable construction for controlling the arc by automatically feeding the electrode to maintain the arc at substantially constant length notwithstanding the consumption of the electrode. Mounted within the member 6 is a backing member or backing bar 13 embodying my invention against which the work is clamped by holding members 14 forming a part of or attached to members 5. The backing member 13 is supported in any suitable manner within the member 6 whereby it may be advanced against the work which it clamps between itself and the holding members 14. For example, it may be supported on means adapted to be operated by fluid pressures for forcing it into contact with the parts to be welded to clamp these parts to the holding members as set forth in Letters Patent No. 1,640,437 granted August 30, 1927, on my application, Serial No. 9,403, filed February 16, 1925, for electric welding, and assigned to the same assignee as the present application.

Referring to Fig. 2, which shows in section one construction of my improved backing member together with parts of the cooperating work holding members 14 taken along the section 2—2 of Fig. 1, the backing strip 15 against which the work parts are clamped at the seam is illustrated as supported by a second-strip 16 to which it is secured and held in place by two rods 17 welded to the strip 16. This strip 16, it will be noted, is of greater breadth than is necessary to support the backing strip 15 and furnishes a support for parts 18 welded thereto which engage the work on each side of the seam and cooperate with holding members 14 which likewise engage the work, but at a point nearer the seam, in such a manner as to produce bending moments in the work at the seam and force the edges of the work into intimate contact with the backing strip 15 and at the same time force the work to assume a circular form at the seam.

It is apparent that the work-engaging parts 18 of the backing member 13 may be separate and distinct from the part that supports the backing strip 15 so long as they cooperate with suitable holding members to produce bending moments in the work that will force the edge of the work into intimate contact with the backing strip and secure the desired bending. In Fig. 2, the parts are made integral and are so arranged relative to the backing strip as to adapt the backing member for work of circular section.

The backing strip 15 may be of any suitable material to which the weld metal of the joint will not adhere readily. I have found it convenient to use a copper strip. The work-engaging surface of this strip 15 is so shaped that it makes contact with the work along an area of restricted width to insure thereby a firm engagement of the work parts with it at the seam as a result of the bending forces set up in the work by the clamp comprising the backing member and the holding members previously described. The particular configuration of the work-engaging surface of the backing strip 15 will vary for different kinds of work. For thin work, I prefer to construct the strip so as to afford a narrow work-engaging portion, while, for heavier work, a wider area of contact may be provided. For some types of heavy work, it may be desirable to groove the work-engaging portion of this strip that immediately lies beneath the seam, as illustrated in Fig. 3 which shows a section of a backing strip suitable for insertion in the backing member shown in Fig. 4, so that thorough penetration may be secured during welding and a reinforcing strip of the weld metal may be formed on the under side of the work.

The modification shown in Fig. 4 is similar to that shown in Fig. 2 with the exception that means are provided for adjusting the relative location of the parts of the backing bar 13 so that it may be adjusted for work of different curvatures including flat work. The parts are arranged as in Fig. 2 but provision is made for adjustably locating the strips 18 relative to the supporting plate 16 and the chill bar or strip 15 by the provision of screws 19. By loosening the screws 19 and inserting or removing shims between the strips 18 and their supporting parts, it is apparent that the curvature determined by the supporting edges of these strips and the central ridge of the chill bar 15 may be suitably varied to accommodate work of various curvature. For the accommodation of flat plates the strips 18 are elevated to a level with strip 15. The arrangement illustrated is such that the strips 18 also serve to clamp the chill bar 15 in place. It is apparent, however, that the construction may assume many forms and that that form illustrated in Fig. 3 is but for the purpose of illustrating the feature of adjustability.

In Fig. 5 I have illustrated a backing member embodying my invention that is particularly adapted for the welding of flat plates. In the construction illustrated the work-engaging parts 18 of the backing member 13 have been modified to better enable them to coact with members 14 in forcing the work parts into engagement with the backing strip 15. In this figure as in the preceding figures the work on each side of the seam is clamped against the backing strip by a three-point contact system, one of the points of contact being the backing strip itself.

The embodiments of the invention illustrated and described herein have been selected for the purpose of clearly setting forth the principles involved. It will be apparent, however, that the invention is susceptible of being modified to meet different conditions encountered in use and I, therefore, aim to cover by the appended claims all modifications within the true spirit and scope of my invention.

What I claim as new, and desire to secure by Letters Patent of the United States, is:

1. A work clamping mechanism for fusion welding apparatus comprising work holding means arranged along the line of the seam to be welded and spaced laterally therefrom and a backing member comprising a backing strip having a relatively narrow work engaging portion extending along the line of the seam and being provided with means for engaging the parts to be welded on each side of the seam spaced laterally therefrom a greater distance than said holding means to produce bending moments in the work to force the edges of the parts to be welded into intimate contact with the backing strip.

2. Work clamping mechanism for fusion welding comprising work holding members having edges extending along the line of the seam between the parts to be welded, a backing member comprising a relatively narrow backing strip extending along the line of the seam and closer thereto laterally than the edges of said holding members, and a support for said backing strip comprising means extending laterally beyond said backing strip and arranged to engage the work and cooperate with said holding members to produce bending moments in the work to force the edges of the parts to be welded into intimate contact with the backing strip.

3. Apparatus for fusion welding comprising a backing strip, a support for said backing strip, means spaced laterally from said strip, and means engaging the work between said backing strip and said spaced means for clamping the work against the backing strip.

4. Apparatus for fusion welding comprising a backing strip, a support for said backing strip having work engaging portions extending laterally beyond said backing strip, and means intermediate said backing strip and the work engaging portion of said support coacting with said portions of said support to produce bending moments in the work to force the edges of the work against said backing strip and to bend the work parts at the seam.

5. In a welding machine adapted to weld curved work parts, work holding members adapted to engage one side of the work parts along the line of the seam to be welded at a distance therefrom, a backing strip having a curved surface intermediate said holding members, and means for engaging the other side of the work parts on each side of the seam at a greater distance therefrom than said work holding members.

6. In a welding machine adapted to weld curved parts, work clamping mechanism comprising a backing strip, a support for said backing strip extending laterally beyond said backing strip, work supporting members on the extending portions of said support, and means for adjusting said work supporting members relatively to the backing strip to accommodate work of varying curvature and means engaging the work parts between said backing strip and said work supporting members for clamping the work against said backing strip.

7. Work clamping mechanism for fusion welding comprising a backing strip having a relatively narrow work engaging surface, means for engaging the work at a point spaced laterally from the work engaging surface of said backing strip to force the work against the backing strip and means for engaging the work on the same side of the work as the backing strip and spaced laterally at a greater distance than the first work engaging means whereby a three-point clamping effect is produced.

In witness whereof, I have hereunto set my hand this 30th day of July, 1926.

VERNI J. CHAPMAN.